United States Patent
Ljolje et al.

(10) Patent No.: US 8,312,492 B2
(45) Date of Patent: Nov. 13, 2012

(54) SYSTEMS AND METHODS OF PROVIDING MODIFIED MEDIA CONTENT

(75) Inventors: Andrej Ljolje, Morristown, NJ (US);
Ann Syrdal, Morristown, NJ (US);
Alistair Conkie, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 821 days.

(21) Appl. No.: 11/725,591

(22) Filed: Mar. 19, 2007

(65) Prior Publication Data

US 2008/0235741 A1    Sep. 25, 2008

(51) Int. Cl.
*H04N 7/173* (2011.01)
*G06F 15/00* (2006.01)
*G10L 11/00* (2006.01)

(52) U.S. Cl. ............... 725/88; 725/89; 725/90; 704/200
(58) Field of Classification Search .................. 704/200; 725/86–89
See application file for complete search history.

(56) References Cited

U.S. PATENT DOCUMENTS

| | | | |
|---|---|---|---|
| 5,848,239 A * | 12/1998 | Ando | 709/203 |
| 5,864,682 A * | 1/1999 | Porter et al. | 709/247 |
| 6,606,479 B2 | 8/2003 | Cook et al. | |
| 6,625,387 B1 | 9/2003 | Blair et al. | |
| 6,880,171 B1 | 4/2005 | Ahmad et al. | |
| 7,130,253 B2 | 10/2006 | Hosono | |
| 7,676,142 B1 * | 3/2010 | Hung | 386/131 |
| 7,739,715 B2 * | 6/2010 | He et al. | 725/90 |
| 2001/0013128 A1 | 8/2001 | Hagai et al. | |
| 2003/0165326 A1 | 9/2003 | Blair et al. | |
| 2003/0212997 A1 * | 11/2003 | Hejna, Jr. | 725/88 |
| 2006/0029365 A1 * | 2/2006 | Hamasaka | 386/68 |
| 2007/0003215 A1 | 1/2007 | Ito et al. | |
| 2008/0235741 A1 * | 9/2008 | Ljolje et al. | 725/89 |

OTHER PUBLICATIONS

"Text-to-Speech Tutorial," Covering Next Generation Computing and Communications Technologies, WAVE Report <http://www.wave-report.com/tutorials/TTS.htm> retrieved Mar. 6, 2007, 2 pages.

* cited by examiner

*Primary Examiner* — Nasser Goodarzi
*Assistant Examiner* — Fred Pengi
(74) *Attorney, Agent, or Firm* — Toler Law Group, PC

(57) ABSTRACT

A method and system of providing media content is disclosed. In a particular embodiment, the method includes receiving media content from a content source at a set-top box device. The media content includes video data having a first playback rate and audio data having the first playback rate. The method further includes transforming the audio data via a non-linear transformation to produce modified audio data having a second playback rate, modifying the video data to produce modified video data having the second playback rate, and synchronizing the modified audio data and the modified video data to produce modified media content having the second playback rate. A network-based media content storage device and associated logic to provide adjusted rate audio content are also disclosed.

19 Claims, 7 Drawing Sheets

SYSTEMS AND METHODS OF PROVIDING MODIFIED MEDIA CONTENT

FIELD OF THE DISCLOSURE

The present disclosure relates to systems and methods of providing modified media content.

BACKGROUND

Media content may be viewed at a recorded rate, at an increased viewing rate in order to scan for particular portions, or at a slowed rate in order to more closely study the content. A system may allow a user to select an option to view the media content at twice the recorded speed, for example, and the user typically views the sped-up media content without an accompanying audio track. The system may also allow the user to select another option to view the media content at one-half the recorded speed, without an accompanying audio track.

DETAILED DESCRIPTION OF THE DRAWINGS

Figure 1:
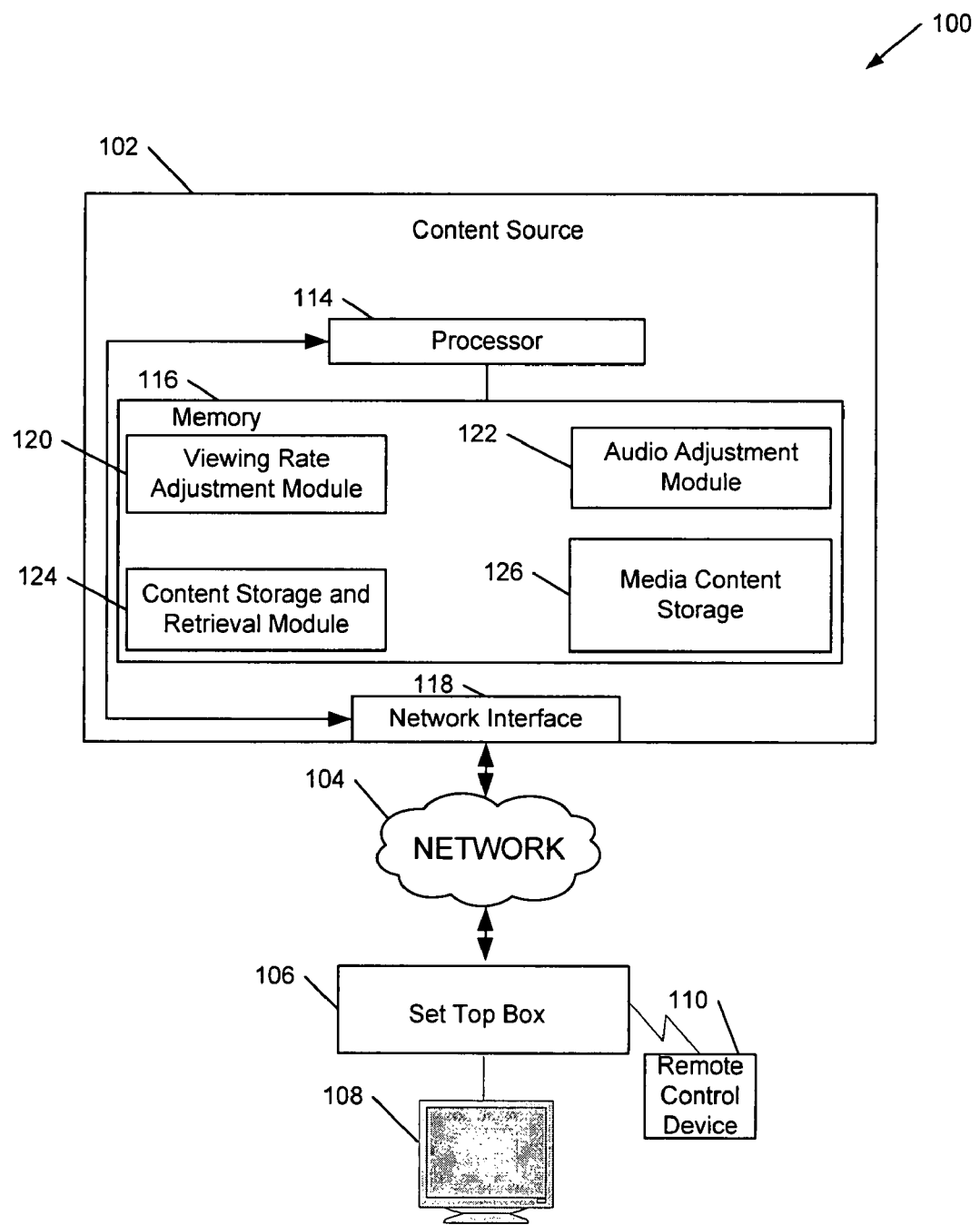
FIG. 1 is a block diagram of a particular illustrative embodiment of a system to provide modified media content.

A method and system of providing media content is disclosed. In a particular embodiment, the method includes receiving media content from a content source at a set-top box device. The media content includes video data having a first playback rate and audio data having the first playback rate. The method further includes transforming the audio data via a non-linear transformation to produce modified audio data having a second playback rate, modifying the video data to produce modified video data having the second playback rate, and synchronizing the modified audio data and the modified video data to produce modified media content having the second playback rate.

In another embodiment, the method is directed at playback rate adjustment, and includes receiving an adjusted playback rate input for selected media content stored at a digital video recording device, the selected media content including audio and video. The method further includes processing the audio to identify speech portions including consonant portions, vowel portions and silent portions. The method also includes applying a non-linear adjustment to the speech portions to produce adjusted audio at an adjusted audio playback rate.

In another embodiment, the method is directed to providing modified media content and includes receiving a user-specified selection of media content at a network server, and retrieving the selected media content where the selected media content has an initial playback rate. The selected media content includes audio data having the initial playback rate and video data having the initial playback rate. The method further includes transforming the audio data to produce modified audio data having a second playback rate, modifying the video data to produce modified video data having the second playback rate, and combining the modified audio data and the modified video data to produce modified media content having the second playback rate.

In a particular illustrative embodiment, the system is directed to a network accessible digital storage device that includes a computer readable memory including media content including audio data and video data, a network interface to a content delivery network, and media playback rate adjustment logic to adjust a video playback rate and an audio playback rate of selected media content retrieved from the computer readable memory to produce a playback rate-adjusted media content including playback rate-adjusted audio data and playback rate-adjusted video data.

In another embodiment, the system is to adjust a playback rate and includes a processor and a memory accessible to the processor. The memory includes a media content module executable by the processor to receive selected media content including audio and video and includes an audio portion detection module executable by the processor to process the audio data to identify speech portions including consonant portions, vowel portions and silent portions of the audio data. The memory also includes an audio adjustment module executable by the processor to receive an adjusted playback rate input and to selectively modify the speech portions of the audio data to produce an adjusted audio data at approximately the adjusted playback rate input.

FIG. 1 is a block diagram of a particular illustrative embodiment of a system 100 to provide modified media content. The system 100 includes a set-top box device 106 that communicates with a content source 102 via a network 104. In a particular embodiment, the content source 102 can be a video server or other content source of an Internet Protocol Television (IPTV) system. In an illustrative embodiment, the network 104 can be a content delivery network, such as an access network of an IPTV system, a satellite interface, a cable television interface, or any combination thereof. The set-top box device 106 communicates with a remote control device 110. Further the set-top box device 106 provides video data, audio data, or any combination thereof to a display device 108.

The content source 102 includes a processor 114 and memory 116 accessible to the processor. The content source 102 further includes a network interface 118 responsive to the network 104. The memory 116 includes a viewing rate adjustment module 120 executable by the processor 114 to adjust a viewing rate of selected media content. The memory 116 further includes an audio adjustment module 122 executable by the processor 114. In a particular illustrative embodiment, the audio adjustment module 122 may preserve a pitch associated with the audio as the speech rate of the audio is changed. The memory 116 further includes a content storage and retrieval module 124 to store media content at a media content storage 126 and to retrieve selected media content from the media content storage 126.

In a particular illustrative embodiment, a user may request media content via the remote control device 110, which communicates with the set-top box device 106. The media content may include video data and audio data having a first viewing rate. In a particular embodiment, the user may request the media content from a webpage interface via the network 104.

The set-top box device 106 may send data indicating the request to the content source 102 via the network 104. The content source 102 may store the requested media content at the media content storage 126. The processor 114 may retrieve the requested media content by executing instructions associated with the content storage and retrieval module 124. The processor 114 may send the requested media content to the set-top box device 106. The user may view the requested media content at the display device 108.

The user may initiate a request to change from the first viewing rate to a second viewing rate. In an illustrative embodiment, the user may enter the second viewing rate via the remote control device 110. The set-top box device 106 may receive a user entry specifying the second viewing rate and send data related to the user entry to the content source 102. The content source 102 may receive the data related to the user entry. In response to receiving the data related to the user entry, the processor 114 may modify the media content to produce modified media content having approximately the second viewing rate, by executing instructions associated with the viewing rate adjustment module 120. The modified media content may include modified video data and modified audio data. The processor 114 may synchronize the modified video data and the modified audio data by executing instructions associated with the viewing rate adjustment module 120. Synchronizing is a process for aligning the modified audio data with corresponding images within the modified video data.

For example, in a particular illustrative non-limiting embodiment, if a portion of the media content features a scene in which a person is delivering a speech, the synchronized modified media content may contain modified video data featuring the scene of the person delivering the speech, and modified audio data corresponding with the images of the modified video data.

In a particular embodiment, the processor 114 may adjust a pitch of the modified audio data, by executing instructions associated with the audio adjustment module 122. In a particular embodiment, a pitch adjustment may be applied that is based on a first viewing rate and a second viewing rate. In an illustrative embodiment, the processor 114 may adjust the pitch so that each voice within the modified audio data sounds similar to a corresponding voice within audio data of the media content before modification. In a particular illustrative example, the pitch adjustment may preserve the pitch of the audio data. The audio adjustment module 122 can be executed by the processor 114 to preserve the pitch of the audio by maintaining the original pitch, the formants, and other aspects of speech that reflect the original speech characteristics of the speaker, allowing the modified audio data to sound like "natural speech." In similar fashion, the processor 114 may adjust the pitch associated with non-speech sounds included in the modified audio data to preserve the pitch of the audio data before modification.

There are a variety of techniques, including non-linear transformation techniques that may be employed for preserving a pitch of speech while changing a speaking rate, familiar to those skilled in the art. Techniques that may be employed include: time domain overlap and add techniques such as Waveform Similarity OverLap-Add (WSOLA) Technique and Pitch Synchronous OverLap Add (PSOLA) Technique; frequency domain techniques such as Linear Predictive Coding (LPC), and Harmonic Plus Noise Model (HNM) techniques; other pitch correcting techniques; or any combination thereof.

In a particular embodiment, audio data having a first playback rate is retrieved from a media content source and is transformed via a non-linear transformation to produce modified audio data at a second playback rate. The method of non-linear transformation may include applying a non-linear adjustment including duplicating selected frames associated with one or more speech portions of the audio data, speech portions including vowel portions, consonant portions and silent portions, to extend the audio when the second playback rate (i.e. an adjusted playback rate) is slower than a recorded playback rate. In a particular illustrative embodiment, one or more of the speech portions of the audio data may be adjusted to a greater extent than one or more of the other speech portions of the audio data. In an illustrative example with one vowel portion, one consonant portion and one silent portion, the non-linear adjustment may include duplicating a first number of frames of the vowel portion, duplicating a second number of frames of the consonant portion, and duplicating a third number of frames of the silent portion, where the first number, the second number, and the third number may be different from one another. In another example, the method includes applying the non-linear adjustment by deleting selected frames associated with one or more of the vowel portions of the audio data to shorten the audio when the adjusted playback rate is faster than a recorded playback rate. The method also can include interpolating between adjacent frames to smooth transitions between frames after the selected frames are deleted. By application of a non-linear transformation, the audio playback, such as speech related to a scene of a movie, can be heard and understood by a user of a display device and a playback device (e.g. television and set-top box) while the user is fast-forwarding through a media program. In addition, to further assist a user in hearing and understanding the audio portion of a program while the program is in a fast-forward or slowdown mode, the audio data can be pitch-preserved with respect to audio playback at a standard (i.e., recorded) playback rate. One method of pitch preservation can include modifying the audio data such that a first audio pitch range of the recorded audio data (i.e., standard speed audio) is similar to a second audio pitch range of the modified audio data at the second playback rate (i.e. speed adjusted for playback during fast-forward or slowdown playback mode). A pitch range may represent a range of frequencies of an audio signal corresponding to the audio data.

The content source 102 may provide the modified media content to the set-top box device 106 via the network 104. The user may view the modified media content at the display device 108. The user may hear the modified audio data via the display device 108.

In a particular illustrative embodiment, the user may request the second viewing rate to be faster than the recorded rate of the media content. For example, the second viewing rate is 1.2 times as fast as the recorded rate, i.e., 20% faster than the recorded rate. The modified video data may be viewed at a rate of 1.2 times the recorded rate and the modified audio data may be heard at a rate of 1.2 times the recorded rate. With pitch adjustment applied to the modified audio data, the pitch of the modified audio rate may sound like natural speech, i.e. speech having preserved pitch characteristics that are similar to the speech as recorded.

In a particular illustrative embodiment, the user may decide to change the viewing rate to another viewing rate that is 1.5 times the recorded rate, i.e., 50% faster than the recorded rate. The content source may provide the modified media content at a viewing rate of 1.5 times the recorded rate. The set-top box device 106 may provide the modified media content to the display device 108. The user may view the modified video data at 1.5 times the recorded rate and hear the accompanying audio soundtrack at 1.5 times the recorded rate. The modified audio data may have a pitch adjustment to preserve the recorded pitch in the modified audio data so that the speech sounds natural, i.e., each voice heard within its expected pitch range, rather than at a higher pitch than recorded.

In general, a user may have flexibility in viewing the media content. For example, the user may select a second viewing rate that is faster than the recorded rate or slower than the recorded rate. In an illustrative example, the second viewing rate may be less than twice the recorded rate. In another illustrative example, the viewing rate may be less than the recorded rate, and the video data may appear as if actions are occurring in "slow motion." The accompanying modified audio data may be delivered synchronously with the modified video data, and the pitch of the modified audio data may be adjusted to preserve the pitch range of the media content as recorded.

In an illustrative example, the user may choose to increase the viewing rate incrementally. For example, if selected media content has a recorded viewing rate, the user may adjust the viewing rate incrementally, such as by increments of 0.1, 0.05, other increments, or any combination thereof. For example, a user may adjust the viewing rate to approximately 1.15 times the recorded viewing rate (approximately 15% faster than the recorded viewing rate). In this manner, the user may "fine tune" the viewing rate. In a particular illustrative embodiment, the increments may be defined within the set-top box device 106 or at a content source 102, and a user may select a desired viewing rate by depressing a key of the remote control device 110 multiple times, until the desired viewing rate is selected. In another particular illustrative embodiment, a user may enter a desired viewing rate by providing a numerical input.

In a particular illustrative embodiment, the set-top box device 106 may receive a user-selected viewing rate via the remote control device 110, and the set-top box device 106 may transmit data related to the user-selected viewing rate to the content source 102. At some point in a presentation of the modified media content, the user may decide to return to the original viewing rate. By entering the original viewing rate, i.e., viewing rate of 1.0 times the recorded rate, the media content delivered will no longer be modified, and the content source 102 can provide the media content at the original recorded rate to the set-top box device 106.

In a particular illustrative embodiment, a playback rate may be selected from a list of available media content, where each item in the list has a different playback rate. In a particular embodiment, a content provider, such as the content source 102, may provide a media content selection having a replay speed that is slower than a recorded rate and a second media content selection having a replay speed that is faster than a recorded rate. For example, a content provider may offer pre-recorded lectures, teaching materials, and other learning content at a slow rate (i.e. a note-taking speed). The content provider may also offer pre-recorded lectures, teaching materials, and other learning content at a faster rate (i.e. a review/refresh speed). The content source 102 may provide a selectable menu that includes the first and the second media content selections from which a user may choose a particular selection, allowing the user to realize the benefits of the media content having the adjusted playback rate without direct control of the playback rate.

Figure 2:
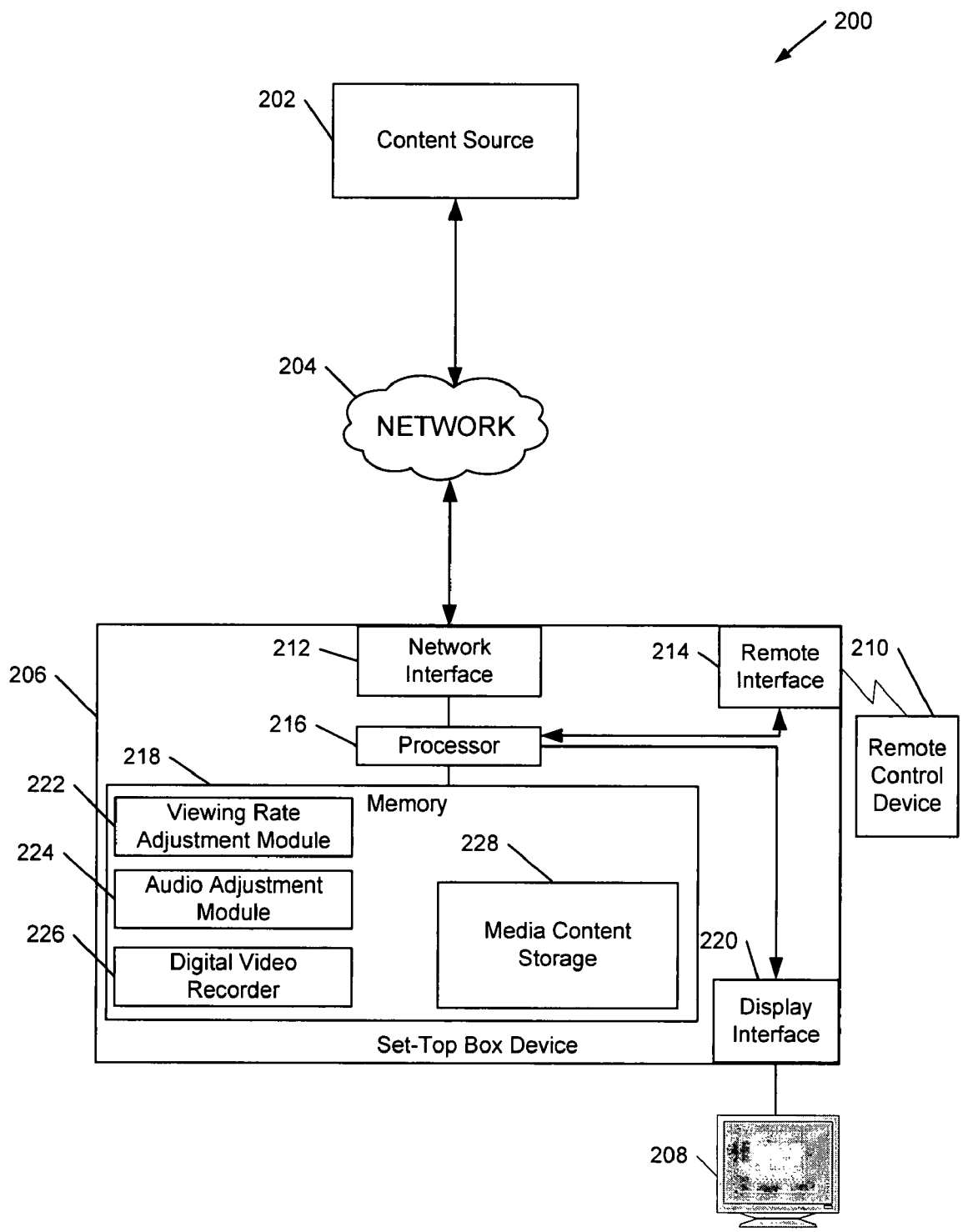
FIG. 2 is a block diagram of a second particular illustrative embodiment of a system to provide modified media content.

FIG. 2 is a block diagram of a second particular illustrative embodiment of a system 200 to provide modified media content. The system 200 includes a set-top box device 206 that communicates with a content source 202 via a network 204. In a particular embodiment, the content source 202 can be a video server or other content source of an Internet Protocol Television (IPTV) system. In an illustrative embodiment, the network 204 can be a content delivery network, such as an access network of an IPTV system, a satellite interface, a cable television interface, or any combination thereof. The set-top box device 206 communicates with a remote control device 210. Additionally, the set-top box device 206 provides video, audio, or any combination thereof to a display device 208. The set-top box device 206 includes a network interface 212 that is responsive to the network 204. The set-top box device 206 also includes a processor 216 that is coupled to the network interface 212 and a memory 218 that is accessible to the processor 216. The set-top box device 206 communicates with the remote control device 210 via a remote interface 214 and provides video, audio or any combination thereof to the display device 208 via a display interface 220.

In a particular illustrative embodiment, a user may select media content via the remote control device 210. In an illustrative embodiment, the user may select the media content via an electronic program guide (EPG) displayed at the display device 208. The set-top box device 206 may request the selected media content from the content source 202 via the network 204. The set-top box device 206 may download the selected media content and store the selected media content at the media content storage 228.

In a particular illustrative embodiment, the user may view the selected media content at a recorded rate. The recorded rate, also referred to herein as a standard viewing rate, is an unmodified viewing rate. In a particular embodiment, the user may enter a viewing rate selection via the remote control device. The viewing rate selection may be faster than the standard viewing rate or slower than the standard viewing rate. For example, the viewer may enter a viewing rate selection that is faster than the standard viewing rate in order to scan the media content in search of a particular portion.

The set-top box device 206 may receive the viewing rate selection via the remote interface 214. In response to receiving the viewing rate selection, the processor 216, executing instructions associated with the viewing rate module 222, may modify the video data and the audio data, producing modified media content having the selected viewing rate. Modifying the media content may include removing or adding frames from the video data, and removing or adding portions of the audio data. The processor 216 may synchronize the modified video data and modified audio data, producing modified media content that is synchronized. In a particular embodiment, the processor 216 may execute instructions associated with the audio adjustment module 224 to preserve a pitch of the audio data. The modified audio data that is pitch-preserved and synchronized with the modified video data can be delivered to the display device 208 via the display interface 220. In a particular illustrative embodiment, the user may view the media content at a selected viewing rate of 1.2 times the standard rate, including the modified video data and the modified video data with pitch preservation to eliminate a "chipmunk effect," in which reproduced voices are pitched higher than originally recorded. Transforming the audio data to modified audio data may also include other non-linear transformations such as vowel shaping, which may enhance intelligibility of the audio data when heard at rates differing from the standard rate.

In a particular illustrative embodiment, the user may enter a viewing rate selection that is slower than the standard viewing rate. In response to the selected viewing rate, the set-top box device 206 may produce modified media content that includes modified video data and modified audio data having the slower rate. The set-top box device 206 may adjust the pitch of the modified, audio data so that voices are in a pitch range that approximates the pitch range associated with the standard viewing rate, i.e., preserving the pitch as originally recorded. The modified media content delivered to the display device 208 may then appear to move in slow motion, with the modified audio data synchronized with the modified video data. While the modified audio data may be received at a slower rate, the voice pitch range may be preserved as it was recorded, rather than resembling a "lethargic" pitch typically associated with a slowed-down audio track.

In a particular illustrative embodiment, the set-top box device 206 may download media content and store the media content at the digital video recorder 226, where the media content can reside until the user wishes to view it. The processor 216 may retrieve the recorded media content and may modify the media content in response to receiving a user-selected viewing rate. In a particular illustrative embodiment, the processor 216 may modify the media content stored in the digital video recorder 226, or in media content storage 228, and store modified media content in media content storage 228 for playback at a future time.

In a particular illustrative embodiment, the user may be able to select viewing rates in discrete increments of the user's choosing. Hence, the user may enter successive viewing rate selections and view the modified content displayed at successive viewing rates. The viewer may be able to fine-tune the viewing rate to a viewing rate, other than the recorded rate, that is comfortable for the viewer, and may listen to the accompanying audio data. In an illustrative embodiment, the viewer may select a viewing rate that is between one and two times the standard viewing rate. In another illustrative embodiment, the viewer may choose a viewing rate selection that is slower than the standard viewing rate to watch a slow-motion version of the video data and hear accompanying audio data slowed down, synchronized and corrected for pitch preservation.

Figure 3:
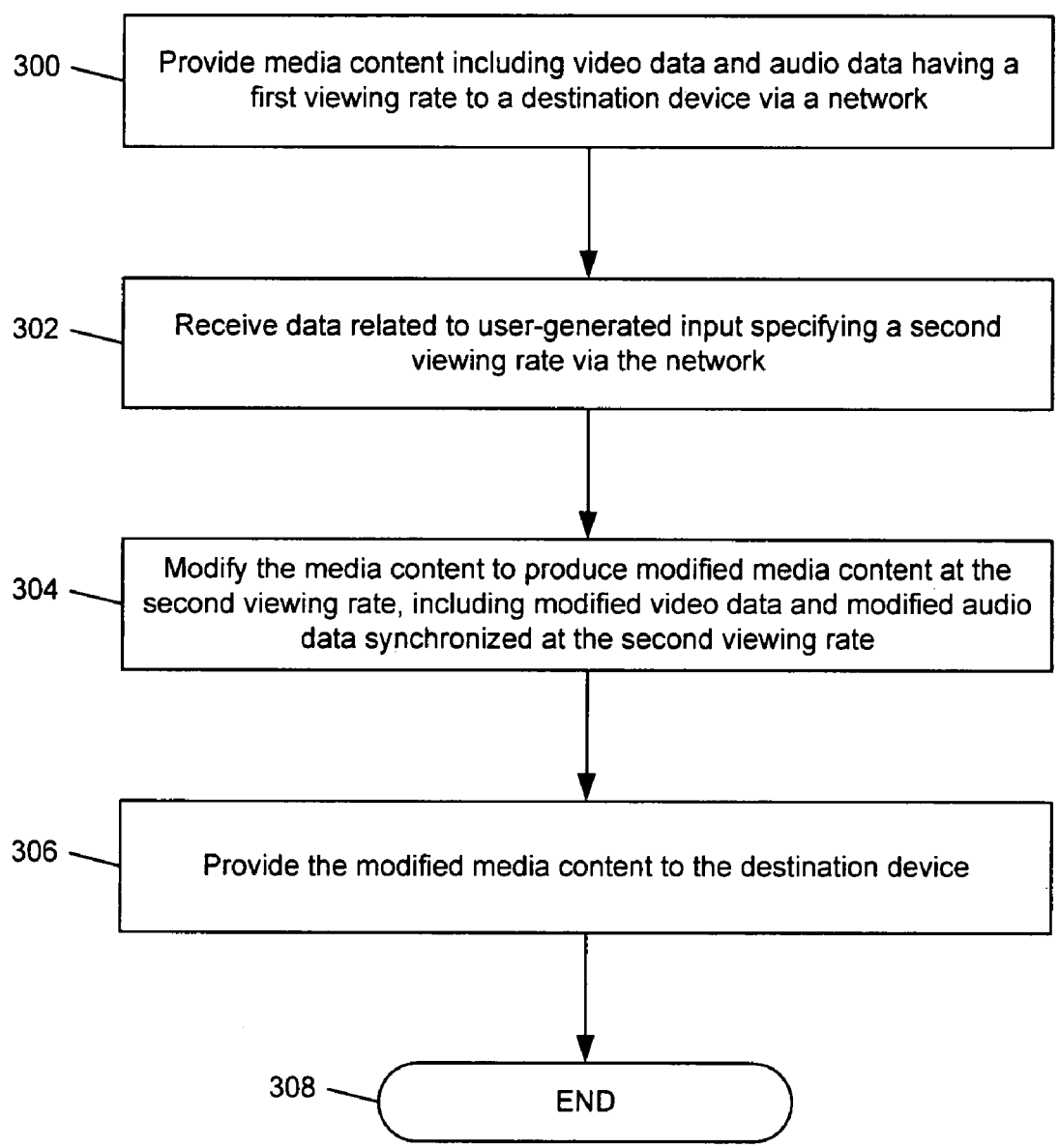
FIG. 3 is a flow diagram of a particular illustrative embodiment of a method of providing modified media content.

FIG. 3 is a flow diagram of a particular embodiment of a method of modifying media content. At block 300, a content source may provide media content including video data and audio data having a first viewing rate to a destination device via a network. Moving to block 302, the content source may receive data related to a user generated input specifying a second viewing rate via the network. Proceeding to block 304, the content source may modify the media content to produce modified media content at the second viewing rate, including modified video data and modified audio data synchronized at the second viewing rate. In a particular embodiment, the content source may also apply a pitch adjustment to the modified audio data. Moving to block 306, the content source may provide the modified media content to the destination device. The method terminates at 308.

Figure 4:
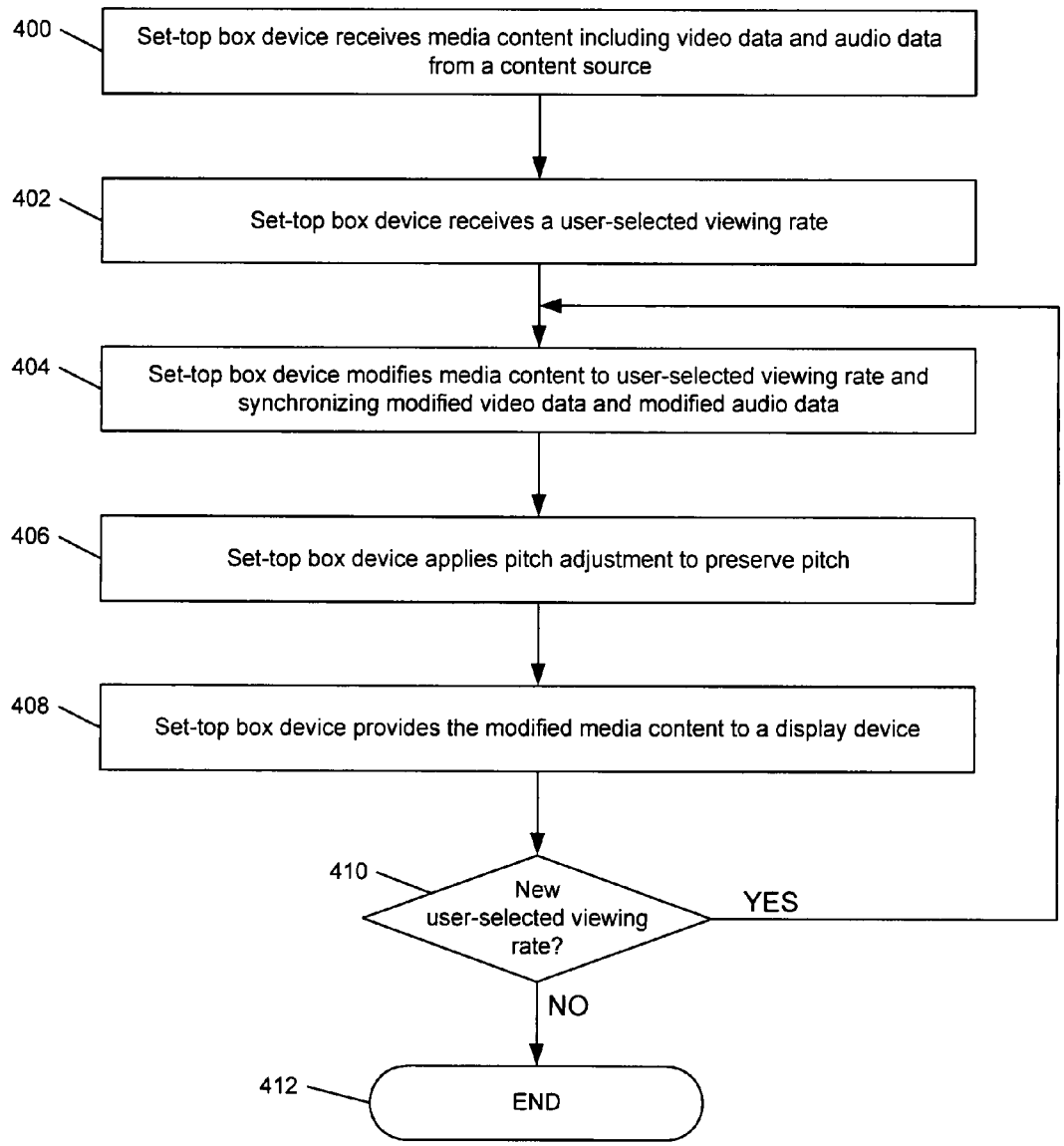
FIG. 4 is a flow diagram of a second particular illustrative embodiment of a method of providing modified media content.

FIG. 4 is a flow diagram of a second particular illustrative embodiment of a method of modifying media content. At block 400, a set-top box device receives media content including video data and audio data from a content source. Moving to block 402, the set-top box device receives a user-selected viewing rate. Proceeding to block 404, the set-top box device modifies the media content to produce modified media content having the user-selected viewing rate, including modified video data and modified audio data approximately synchronized at the viewing rate. Moving to block 406, in a particular embodiment, the set-top box device applies a pitch adjustment to the audio data to preserve pitch, providing modified audio data having a pitch similar to audio data having a standard viewing rate. Proceeding to block 408, the set-top box device provides the modified media content to a display device.

Moving to decision block 410, the set-top box device determines whether it has received a user selection of a new viewing rate. If a new viewing rate is received, the method returns to block 404 and the set-top box device modifies the media content to the new viewing rate, synchronizing the modified video and audio. Thus, the user may fine-tune the viewing rate. Returning to decision block 410, if a new viewing rate is not received, the method terminates at 412.

Figure 5:
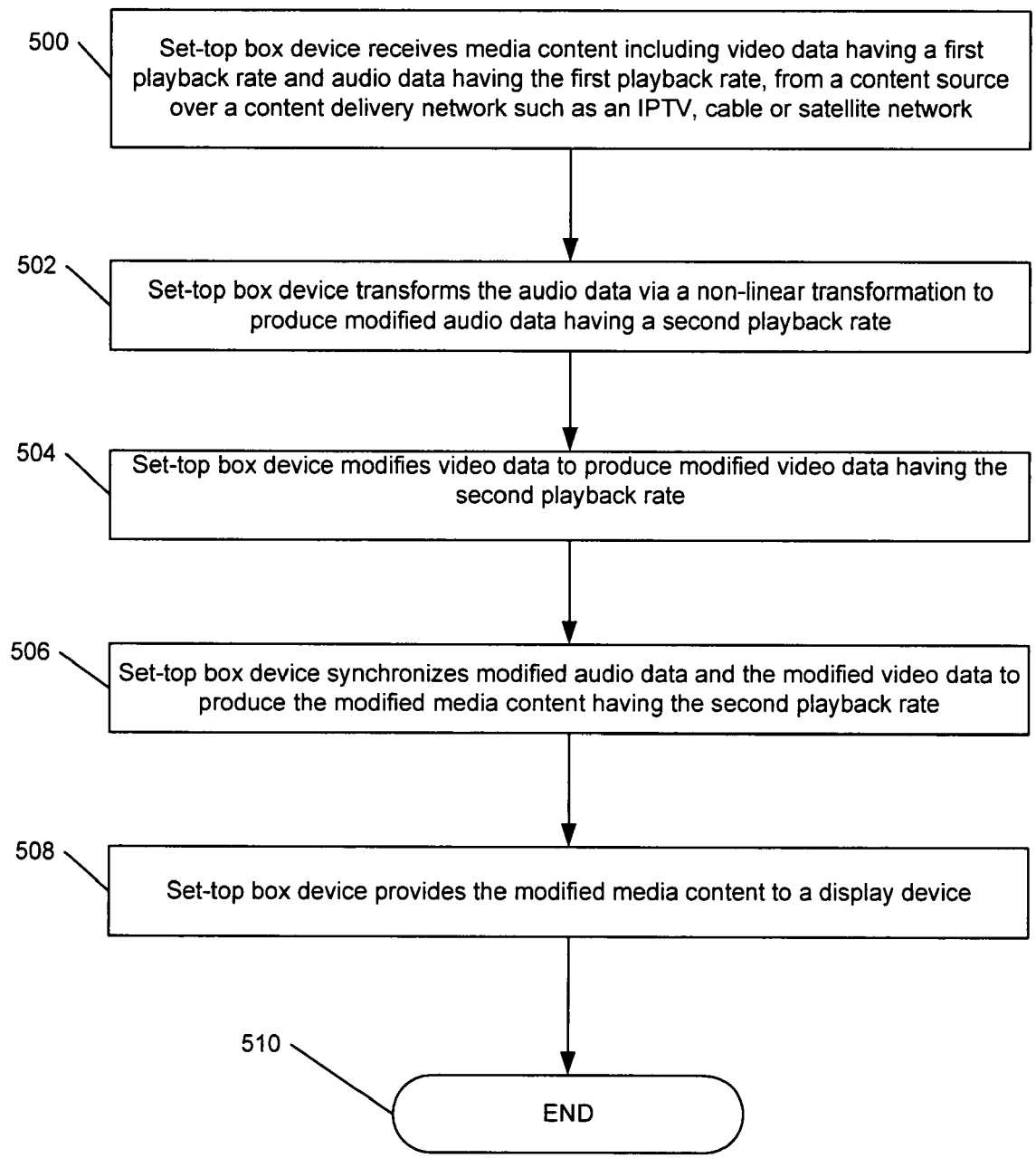
FIG. 5 is a flow diagram of a method of a third particular illustrative embodiment of a method of providing modified media content.

Referring to FIG. 5, a flow diagram illustrates a method of providing media content that includes receiving media content from a content source at a set-top box device, such as via a content delivery network, at 500. The content delivery network can be an internet protocol television interface, a satellite interface, or a cable television interface, or another content delivery network. The media content includes video data having a first playback rate and audio data having the first playback rate. The method further includes transforming the audio data via a non-linear transformation to produce modified audio data having a second playback rate, at 502, and modifying the video data to produce modified video data having the second playback rate, at 504. The method further includes synchronizing the modified audio data and the modified video data to produce modified media content having the second playback rate, at 506. The set top box provides the modified media content to a display device at 508. The method terminates at 510.

Figure 6:
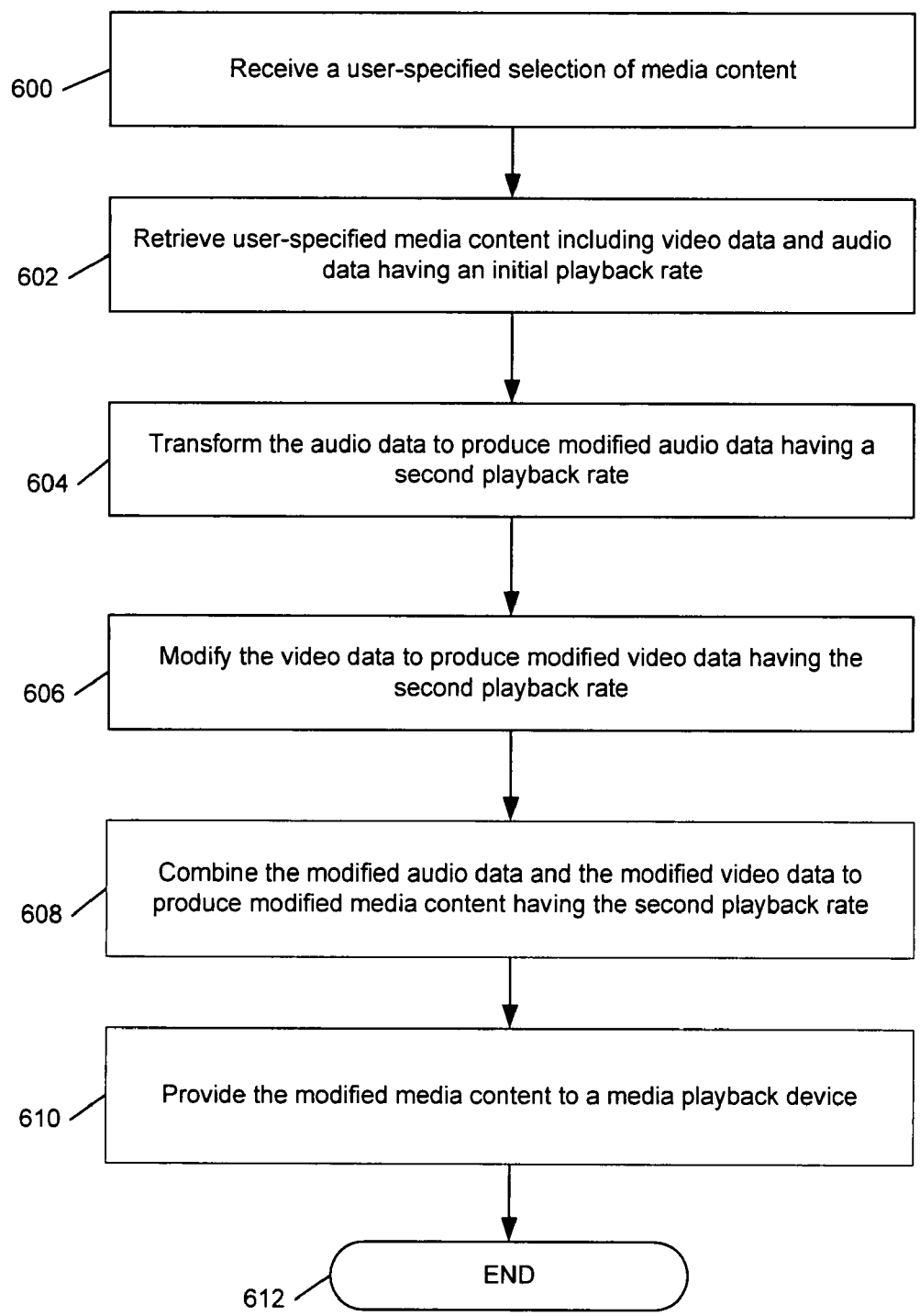
FIG. 6 is a flow diagram of a method of a fourth particular illustrative embodiment of a method of providing modified media content.

Referring to FIG. 6, a flow diagram illustrates a method of providing modified media content. The method includes receiving a user-specified selection of media content at a network server, at 600, and retrieving the selected media content, the selected media content having an initial playback rate, the selected media content including audio data having the initial playback rate and video data having the initial playback rate, at 602. The method also includes transforming the audio data to produce modified audio data having a second playback rate, at 604. The method further includes modifying the video data to produce modified video data having the second playback rate, at 606 and combining the modified audio data and the modified video data to produce modified media content having the second playback rate, at 608. In a particular embodiment, the audio data may be transformed via a non-linear transformation, and the modified audio data and the modified video data may be synchronized. The modified audio data may be substantially pitch preserved with respect to the audio data at the initial playback rate by performing the non-linear transformation. For example, the audio data may have a first audio pitch range that is similar to a second audio pitch range of the modified audio data. As such, modifying the media content may further comprise applying a pitch adjustment to the audio data. The method may further include providing the modified media content to a media playback device, at 610. The method terminates at 612.

In a particular illustrative embodiment, an initial playback rate of the audio data is equal to a recorded rate of the media content. In a particular example, the transforming method involves applying a Waveform Similarity OverLap-Add (WSOLA) transformation to the audio data. Also, in a particular illustrative embodiment, the second playback rate is greater than the initial playback rate. In another embodiment, the second playback rate is less than twice the initial playback rate and in a further embodiment, the second playback rate is less than the initial playback rate. In a particular embodiment, the media content may be modified by adjusting the audio data, such as by adding or removing a portion of the audio data.

Figure 7:
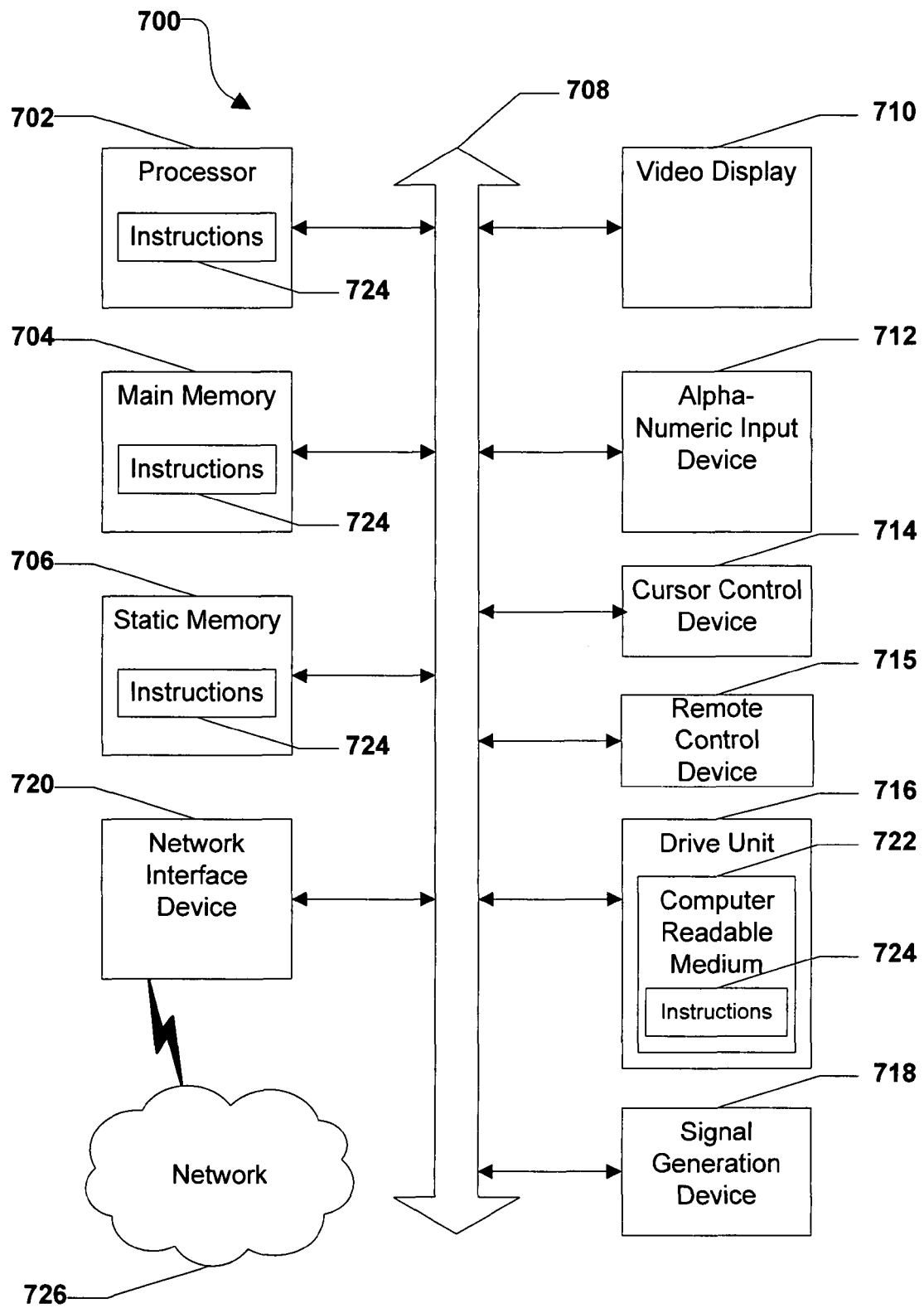
FIG. 7 is a block diagram of an embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a public network, such as the Internet, or a private network, to other computer systems or peripheral devices, including one or more content sources or set-top box devices, as depicted in FIGS. 1 and 2.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box device (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. Further, the computer system 700 can include a wireless input device 715, e.g., a remote control device. When the computer system 700, or any portion thereof, is embodied in a set-top box device, the cursor control device 714 can be a remote control device. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing media content, the method comprising:
    receiving media content from a content source at a set-top box device, wherein the media content includes video data having a first playback rate and audio data having the first playback rate, wherein a first audio pitch range is associated with the audio data at the first playback rate;
    processing the audio data to identify speech portions that include consonant portions;
    transforming the audio data via a non-linear transformation to produce modified audio data having a second playback rate, wherein transforming the audio data via the non-linear transformation includes applying a non-linear adjustment to the consonant portions of the speech portions identified in the audio data, wherein a second audio pitch range is associated with the modified audio data, and wherein the second audio pitch range is within the first audio pitch range;
    modifying the video data to produce modified video data having the second playback rate;
    synchronizing the modified audio data and the modified video data to produce modified media content having the second playback rate;
    storing, at a digital video recorder coupled to the set-top box device, the media content having the first playback rate and the modified media content having the second playback rate;
    during playback of the media content at the first playback rate, receiving a command at the set-top box device to change from the first playback rate to the second playback rate; and
    in response to receiving the command, retrieving the modified media content having the second playback rate from the digital video recorder of the set-top box device.

2. The method of claim 1, wherein the media content is received at the set-top box device over a content delivery network.

3. The method of claim 2, wherein the content delivery network includes an internet protocol television network.

4. The method of claim 1, further comprising:
    transforming the audio data to produce second modified audio data having a third playback rate, wherein a third audio pitch range is associated with the second modified audio data, and wherein the third audio pitch range is within the first audio pitch range;
    modifying the video data to produce second modified video data having the third playback rate;
    synchronizing the second modified audio data and the second modified video data to produce second modified media content having the third playback rate;
    storing, at the digital video recorder coupled to the set-top box device, the second modified media content having the third playback rate;

during playback of the media content, receiving a second command at the set-top box device to change to the third playback rate; and in response to receiving the second command, retrieving the second modified media content having the third playback rate from the digital video recorder of the set-top box device.

5. A network accessible digital storage device comprising:
a computer readable memory including media content comprising audio data having a first audio playback rate and video data having a first video playback rate, wherein a first audio pitch range is associated with the audio data at the first audio playback rate;
a network interface to a content delivery network; and
media playback rate adjustment logic to:
  process the audio data to identify speech portions that include consonant portions;
  adjust the first video playback rate of the video data and the first audio playback rate of the audio data associated with the media content retrieved from the computer readable memory, wherein playback rate-adjusted media content includes playback rate-adjusted audio data and playback rate-adjusted video data, wherein the playback rate-adjusted audio data is produced by applying a non-linear adjustment to the consonant portions of the speech portions identified in the audio data, and wherein a second audio pitch range associated with the playback rate-adjusted audio data is within the first audio pitch range;
  store the playback rate-adjusted media content at the computer readable memory;
  receive a command from a remotely located media playback device to receive the playback rate-adjusted media content; and
  in response to receiving the command, retrieve the playback rate-adjusted media content from the computer readable memory.

6. The device of claim 5, wherein the media content is a portion of a streaming data file.

7. The device of claim 5, wherein the playback rate-adjusted media content is distributed via the network interface to the remotely located media playback device.

8. The device of claim 5, wherein the command is one of a fast-forward command and a slowdown command.

9. The device of claim 5, wherein applying the non-linear adjustment to the consonant portions of the speech portions identified in the audio data includes one of adding, to the audio data, one or more frames of the consonant portions of the speech portions identified in the audio data and deleting, from the audio data, the one or more frames of the consonant portions of the speech portions identified in the audio data.

10. A method of providing modified media content, the method comprising:
  receiving a user-specified selection of media content at a network server from a remotely located media playback device;
  retrieving the selected media content in response to receiving the user-specified selection, the selected media content having an initial playback rate, wherein the selected media content comprises audio data having the initial playback rate and video data having the initial playback rate, wherein a first audio pitch range is associated with the audio data at the initial playback rate;
  processing the audio data to identify speech portions that include consonant portions;
  transforming the audio data to produce modified audio data having a second playback rate, wherein transforming the audio data includes applying a non-linear adjustment to the consonant portions of the speech portions identified in the audio data, wherein a second audio pitch range is associated with the modified audio data, and wherein the second audio pitch range is within the first audio pitch range;
  modifying the video data to produce modified video data having the second playback rate;
  combining the modified audio data and the modified video data to produce modified media content having the second playback rate;
  storing the modified media content having the second playback rate and the selected media content having the initial playback rate at the network server;
  during playback of the selected media content at the initial playback rate, receiving a command from the remotely located media playback device to change from the initial playback rate to the second playback rate; and
  in response to receiving the command, retrieving the modified media content having the second playback rate.

11. The method of claim 10, wherein the audio data is transformed via a non-linear transformation and wherein combining the modified audio data and the modified video data to produce the modified media content includes synchronizing the modified audio data and the modified video data.

12. The method of claim 10, further comprising providing the modified media content to the remotely located media playback device via an internet protocol television network.

13. The method of claim 10, wherein the initial playback rate is equal to a recorded rate of the media content.

14. The method of claim 10, wherein transforming comprises applying a Waveform Similarity OverLap-Add transformation to the audio data.

15. The method of claim 10, wherein the second playback rate is greater than the initial playback rate.

16. The method of claim 10, wherein the second playback rate is less than twice the initial playback rate.

17. The method of claim 10, wherein the second playback rate is less than the initial playback rate.

18. The method of claim 10, further comprising:
  processing the audio data to identify the speech portions that include vowel portions, silent portions, or any combination thereof;
  wherein transforming the audio data includes applying the non-linear adjustment to the consonant portions, the vowel portions, the silent portions, or any combination thereof of the speech portions identified in the audio data, wherein the non-linear adjustment includes adding, to the audio data, one or more frames of the consonant portions, the vowel portions, the silent portions, or any combination thereof of the speech portions identified in the audio data.

19. The method of claim 4, wherein the third playback rate is greater than the second playback rate.

* * * * *